No. 624,486.   
J. E. HILLS.  
CUFF BUTTON.  
(Application filed Nov. 14, 1898.)  
Patented May 9, 1899.

(No Model.)

WITNESSES:
J. E. Pearson
W. H. Pumphrey

INVENTOR
James E. Hills
BY
Bolt H. Benjamin
ATTORNEY

UNITED STATES PATENT OFFICE.

JAMES E. HILLS, OF NEW YORK, N. Y.

CUFF-BUTTON.

SPECIFICATION forming part of Letters Patent No. 624,486, dated May 9, 1899.

Application filed November 14, 1898. Serial No. 696,429. (No model.)

*To all whom it may concern:*

Be it known that I, JAMES E. HILLS, a citizen of the United States, residing at New York city, county of Kings, State of New York, have invented new and useful Improvements in Cuff-Buttons, of which the following is a specification.

My invention has reference to a cuff-button of the type consisting of two heads and a connecting member. Heretofore cuff-buttons of this description have had the connecting member formed either as a bar rigidly connected to both heads or as a link loosely connected to both heads.

My improved cuff-button combines in the connecting member the features of both forms in that a bar is rigidly connected to one head at its outer edge and loosely connected to the other head through a link or other form of loose connection. The connecting member is therefore formed of a bar and a link or its equivalent. The object of this arrangement is to obtain the advantages of a bar to assist in introducing the heads into the buttonholes of a cuff and that of a link in the adaptability of the cuff-button to the shape of the cuff when on the wearer.

The accompanying drawings will serve to illustrate my invention, and in which similar letters of reference indicate like parts.

Figure 1:
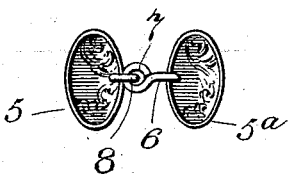
Figure 2:
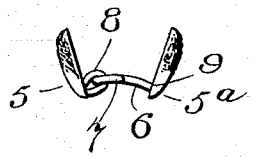
Figure 3:
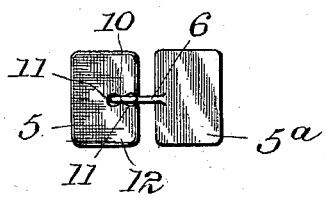
Figure 4:
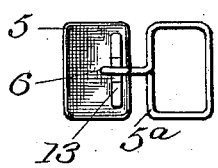
Figure 5:
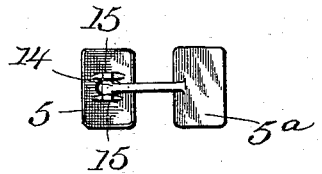
Figure 6:
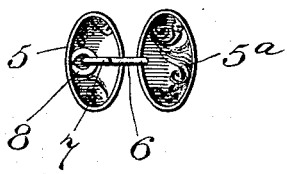

Figure 1 is a back view of a cuff-button containing my improvement. Fig. 2 is a side view. Figs. 3, 4, and 5 show modifications. Fig. 6 is a back view and also shows a modification.

In the drawings, 5 $5^a$ represent the heads, which may be of any suitable design. The connecting member for the heads in Figs. 1 and 2 is composed of the bar 6, having the eye 7 and fixed eye 8. The bar 6 is connected at one end to the outer edge of the head $5^a$, as shown clearly at 9, Fig. 2. The eye 8, Figs. 1 and 2, projects upward or outward from the rear of the head, whereas in Fig. 6 the eye 8 projects in a line with the head—that is, horizontally. The eye 7 in Fig. 6 is correspondingly altered to meet the changed position of the eye 8. The eyes 7 and 8, Figs. 1, 2, and 6, are connected.

In Fig. 3 the bar 6 is provided with an extension 10 of smaller diameter, which is turned through the two holes 11 11 in the plate 12 of the head 5. In Fig. 4 the bar 6 is turned back on itself and fastened to the head 5 by the strap 13. In Fig. 5 the bar 6 is provided with a T-end 14, the opposite sides of the top of which take under the projections 15 of a plate located on the under side of the head 5. The arrangement in Figs. 3, 4, and 5 also provides a loose hinged connection.

When it is desired to introduce any of the forms of buttons shown in a cuff, the shank 6 is grasped between the thumb and finger of the right hand and the head $5^a$ introduced through the buttonholes.

I do not wish to limit myself to the specific forms of cuff-button embodying the bar and loose connection shown in the several figures in the accompanying drawings, except in so far as relates to the attachment of the bar at one end to the outer edge of one head, as many changes can be made without departing from the intent of my invention.

Having thus described my invention, I claim—

1. In a cuff-button, the combination with the heads, of a connecting member rigidly attached to the outer edge of one head and loosely attached to the other head.

2. In a cuff-button, the combination with the heads, of a connecting member comprising a bar rigidly attached to the outer edge of one head and loosely attached to the other head.

3. In a cuff-button, the combination with the heads, of a connecting member comprising a bar rigidly attached to the outer edge of one head by one end and loosely attached to the other head by the other end by means of an eye on said end and an eye on said head.

4. In a cuff-button, the combination with the heads, of a connecting member rigidly attached to the outer edge of one head and projecting at right angles therefrom, and loosely connected to the other head.

5. In a cuff-button, the combination with the heads, of a connecting member comprising a bar 6 rigidly attached to the outer edge of one head at one end and provided with an eye 7 at the other end, an eye 8 rigidly attached to the other head and communicating with the eye 7.

In testimony whereof I affix my signature in the presence of two witnesses.

JAMES E. HILLS.

Witnesses:
LILIAN FOSTER,
J. E. PEARSON.